US009131369B2

(12) United States Patent
Ganong, III et al.

(10) Patent No.: US 9,131,369 B2
(45) Date of Patent: Sep. 8, 2015

(54) PROTECTION OF PRIVATE INFORMATION IN A CLIENT/SERVER AUTOMATIC SPEECH RECOGNITION SYSTEM

(71) Applicant: Nuance Communications, Inc., Burlington, MA (US)

(72) Inventors: William F. Ganong, III, Brookline, MA (US); Paul J. Vozila, Arlington, MA (US)

(73) Assignee: Nuance Communications, Inc., Burlington, MA (US)

( * ) Notice: Subject to any disclaimer, the term of this patent is extended or adjusted under 35 U.S.C. 154(b) by 338 days.

(21) Appl. No.: 13/748,878

(22) Filed: Jan. 24, 2013

(65) Prior Publication Data

US 2014/0207442 A1   Jul. 24, 2014

(51) Int. Cl.
*H04W 12/02* (2009.01)
*G10L 15/30* (2013.01)
*G10L 15/18* (2013.01)
*G10L 21/00* (2013.01)
*G10L 15/32* (2013.01)

(52) U.S. Cl.
CPC ............ *H04W 12/02* (2013.01); *G10L 15/30* (2013.01); *G10L 15/1822* (2013.01); *G10L 15/32* (2013.01); *G10L 21/00* (2013.01); *H04M 2201/40* (2013.01)

(58) Field of Classification Search
CPC ........ G10L 21/00; G10L 15/30; H04W 12/02
USPC ....................................................... 704/201
See application file for complete search history.

(56) References Cited

U.S. PATENT DOCUMENTS

| 6,141,753 | A | 10/2000 | Zhao et al. |
| 6,874,085 | B1 | 3/2005 | Koo et al. |
| 7,512,583 | B2 * | 3/2009 | Benson et al. ................. 706/59 |
| 7,526,455 | B2 * | 4/2009 | Benson et al. ................... 706/1 |
| 8,185,392 | B1 | 5/2012 | Strope et al. |
| 8,401,859 | B2 * | 3/2013 | Dhawan et al. ............ 704/270.1 |
| 8,423,476 | B2 * | 4/2013 | Bishop et al. .................. 705/67 |
| 8,433,658 | B2 * | 4/2013 | Bishop et al. .................. 705/67 |

(Continued)

OTHER PUBLICATIONS

U.S. Appl. No. 13/800,738, "Data Shredding for Speech Recognition Language Model Training Under Data Retention Restrictions," filed Mar. 13, 2013.

(Continued)

*Primary Examiner* — Susan McFadden
(74) *Attorney, Agent, or Firm* — Hamilton, Brook, Smith & Reynolds, P.C.

(57) ABSTRACT

A mobile device is adapted for protecting private information on the mobile device in a hybrid automatic speech recognition arrangement. The mobile device includes a speech input component for receiving a speech input signal from a user. Additionally, the mobile device includes a local ASR arrangement for performing local ASR processing of the speech input signal and determining if private information is included within the speech input signal. A control unit on the mobile device obscures private information in the speech input signal if the local ASR arrangement identifies information within a speech recognition result as private information. The control unit releases the speech input signal with the obscured private information for transmission to a remote server for further ASR processing.
Results from the remote server's ASR processing are integrated and combined with results from local ASR processing to display information on the mobile device.

21 Claims, 3 Drawing Sheets

(56) References Cited

U.S. PATENT DOCUMENTS

| | | | |
|---|---|---|---|
| 8,473,451 B1 | 6/2013 | Hakkani-Tur et al. | |
| 8,489,513 B2 * | 7/2013 | Bishop et al. | 705/67 |
| 8,515,745 B1 | 8/2013 | Garrett et al. | |
| 8,515,895 B2 * | 8/2013 | Benson et al. | 706/52 |
| 2002/0023213 A1 | 2/2002 | Walker et al. | |
| 2003/0037250 A1 | 2/2003 | Walker et al. | |
| 2003/0172127 A1 | 9/2003 | Northrup et al. | |
| 2005/0065950 A1 | 3/2005 | Chaganti et al. | |
| 2006/0085347 A1 | 4/2006 | Yiachos | |
| 2006/0136259 A1 | 6/2006 | Weiner et al. | |
| 2007/0118399 A1 | 5/2007 | Avinash et al. | |
| 2007/0282592 A1 | 12/2007 | Huang et al. | |
| 2008/0086305 A1 | 4/2008 | Lewis et al. | |
| 2008/0147412 A1 | 6/2008 | Shaw et al. | |
| 2008/0209222 A1 | 8/2008 | Narayanaswami et al. | |
| 2008/0294435 A1 | 11/2008 | Reynolds et al. | |
| 2009/0132803 A1 | 5/2009 | Leonard et al. | |
| 2010/0071041 A1 | 3/2010 | Ikegami | |
| 2010/0242102 A1 | 9/2010 | Cross et al. | |
| 2010/0255953 A1 | 10/2010 | McCullough et al. | |
| 2010/0281254 A1 | 11/2010 | Carro | |
| 2011/0022835 A1 | 1/2011 | Schibuk | |
| 2011/0054899 A1 | 3/2011 | Phillips et al. | |
| 2011/0131138 A1 | 6/2011 | Tsuchiya | |
| 2011/0197159 A1 | 8/2011 | Chaganti et al. | |
| 2012/0010887 A1 | 1/2012 | Boregowda et al. | |
| 2012/0011358 A1 | 1/2012 | Masone | |
| 2012/0059653 A1 | 3/2012 | Adams et al. | |
| 2012/0079581 A1 | 3/2012 | Patterson | |
| 2012/0095923 A1 | 4/2012 | Herlitz | |
| 2012/0101817 A1 | 4/2012 | Mocenigo et al. | |
| 2012/0166186 A1 | 6/2012 | Acero et al. | |
| 2013/0073672 A1 | 3/2013 | Ayed | |
| 2013/0104251 A1 | 4/2013 | Moore et al. | |
| 2013/0243186 A1 | 9/2013 | Potson, Jr. et al. | |
| 2013/0262873 A1 | 10/2013 | Read et al. | |
| 2013/0263282 A1 | 10/2013 | Yamada et al. | |
| 2013/0346066 A1 | 12/2013 | Deoras et al. | |
| 2014/0058723 A1 | 2/2014 | Shen et al. | |
| 2014/0143533 A1 * | 5/2014 | Ganong et al. | 713/150 |
| 2014/0143550 A1 * | 5/2014 | Ganong et al. | 713/189 |
| 2014/0278425 A1 | 9/2014 | Jost et al. | |
| 2014/0278426 A1 | 9/2014 | Jost et al. | |

OTHER PUBLICATIONS

U.S. Appl. No. 13/800,764, "Data Shredding for Speech Recognition Acoustic Model Training Under Data Retention Restrictions," filed Mar. 13, 2013.

Calpe, J., et al., "Toll-quality digital secraphone," IEEE conference, $8^{th}$ Mediterranean vol. 3:1714-1717 (1996).

DeAndrade, J., et al., "Speech privacy for modem mobile communication systems," IEEE ICASSP 2008 conference Las Vegas, NV, vol. 1: 1777-1780 (2008).

Fazeen, M., et al., Context-Aware Multimedia Encryption in Mobile Platforms, $9^{th}$ Annual Cyber and Information Security Research Conference, CISR '14:53-56 (2014).

Servetti, A., et al., "Perception-based partial encryption of compressed speech," IEEE Transactions on Speech and Audio Processing, 10(8):637-643 (2002).

* cited by examiner

| Last Name | First Name | Address | City | State | Zip Code |
|-----------|------------|---------------|-----------|--------|----------|
| * Smith, | Roger, | 123 Main St. | N.Y, | N.Y. | 10024 |
| * Jones, | *Herbert, | * 369 Essex St. | * Newark, | *N.Y. | *20142 |

PROTECTION OF PRIVATE INFORMATION IN A CLIENT/SERVER AUTOMATIC SPEECH RECOGNITION SYSTEM

TECHNICAL FIELD

The invention generally relates to automatic speech recognition (ASR) and more specifically, to client-server ASR on mobile devices.

BACKGROUND ART

It is known in the prior art to have an automatic speech recognition system (ASR) system for determining a semantic meaning of a speech input. Typically, the speech is processed into a sequence of digital speech feature frames. Each speech feature frame can be thought of as a multi-dimensional vector that represents various characteristics of the speech signal present during a short time window of the speech. For, example the multi-dimensional vector of each speech frame can be derived from cepstral features of the short time Fourier transform spectrum of the speech signal, the short time power or component of a given frequency band, as well as, the corresponding first- and second-order derivatives. In a continuous recognition system, variable numbers of speech frames are organized as utterances representing a period of speech followed by a pause, which in real life loosely corresponds to a spoken sentence or phrase.

Recently, ASR technology has advanced enough to have applications that are implemented on the limited footprint of a mobile device. This can involve a somewhat limited stand-alone ASR arrangement on the mobile device, or more extensive capability can be provided in a client-server arrangement where the local mobile device does initial processing of speech inputs, and possibly some local ASR recognition processing, but the main ASR processing is performed at a remote server with greater resources, then the recognition results are returned for use at the mobile device.

U.S. Patent Publication 20110054899 describes a hybrid client-server ASR arrangement for a mobile device in which speech recognition may be performed locally by the device and/or remotely by a remote ASR server depending on one or more criteria such as time, policy, confidence score, network availability, and the like.

SUMMARY OF THE EMBODIMENTS

In a first embodiment of the invention there is provided a mobile device adapted for automatic speech recognition for protecting private information on the mobile device. The mobile device includes a speech input for receiving a speech input signal from a user. Additionally, the mobile device includes a local ASR arrangement for performing local ASR processing of the speech input signal and determining if private information is included within the speech input signal. A control unit on the mobile device obscures private information in the speech input signal if the local ASR arrangement identifies private information. The control unit releases the speech input signal with the obscured private information for transmission to a remote server for ASR processing.

In certain embodiments of the invention, the control unit obscures the private information by creating a hash code of identified private information and inserts the hash code into the speech input signal in place of the speech data for the private information prior to sending the speech input signal to the remote server. The mobile device can then use the hash code when the result from a server based automatic speech recognition engine for the speech signal is received. The received speech recognition result from the server may include the hash code value and the mobile device can replace the hash code value with the private information prior to displaying the speech recognition result to an end user on the mobile device.

The mobile device may include a user interface that allows a user to identify private information contained within one or more local data stores on the mobile device. The private information may be flagged or identified with a form of indicia indicative that the data is private and should not be transmitted. In certain embodiments of the invention, the control unit receives from a server a remote speech recognition result of the speech input including an indicia of the hash code and the control unit inserts the private information previously removed into at least the final speech recognition result.

The control unit of the mobile device may obscure the private information within the speech signal by removing the speech data representing the private information. In other embodiments, the control unit simply removes the speech data representing the private information prior to transmission to the server. In still other embodiments, the control unit may replace the speech data representing the private information with other data, such as other speech data, a hash code of the data or some other indicia understood by a server in the system that indicates that information is either missing or has been replaced within the speech signal.

Embodiments of the invention may include the generation of speech log on the mobile device. The speech log may indicate what speech has been received, the manner in which the speech has been processed (e.g. language model used, type and size of dictionary etc.), and may include a locally generated speech recognition result. The speech recognition result may include one or more possible version of the speech. For example, the speech recognition result may include an N-best list of possibilities based upon the used dictionary, or a lattice. The speech recognition result may be text-based, phoneme-based, or presented in another commonly used speech format. If the speech recognition result is present within the speech log, the control unit will remove any private data contained recognition result. Additionally, the control unit will remove any private information contained within the speech log prior to transmitting the speech log from the mobile device.

In certain embodiments of the invention in which both a local ASR and server side ASR processing occurs on a speech signal, the server-side ASR may make requests to the mobile device for transfer of one or more sets of information stored within the local data stores of the mobile device. In such embodiments of the invention, the control unit may protect the private information, but may transmit a subset of the complete data set from a local data store. For example, the control unit may transmit only last names from an address book and not transmit other information that might identify the private data, such as first names, addresses, and telephone numbers. In other embodiments of the invention, the control unit may identify private information within the speech signal and may declassify the designation and transfer the private information contained within the speech signal to the server. In this embodiment, the control unit may receive a request for all or a portion of the local data stores. Rather than provide such information to the external server, the control unit will simply declassify information contained within the speech recognition result. As used herein, the term declassify shall mean to change the state of data from a first state to a second state. For example, data may have the state: "private" and when this data is declassified, the data will have the state:

"public". It should be recognized by one of ordinary skill in the art that the speech recognition result may be an N-best list, a lattice, a best match or a combination of phonemes and/or words. Private information may be identified within the local data stores according to one or more conditions. For example, a condition may be that an entire field is designated as private within a database, or individual entries may be designated as private.

BRIEF DESCRIPTION OF THE DRAWINGS

The foregoing features of embodiments will be more readily understood by reference to the following detailed description, taken with reference to the accompanying drawings, in which:

FIG. 2 is screen shot showing an exemplary database and indicia of private information.

DETAILED DESCRIPTION OF SPECIFIC EMBODIMENTS

Embodiments of the present invention are directed to hybrid ASR for a mobile device using a client-server arrangement wherein recognized speech identified as private on the client is managed by the client device such that the private data is either obscured, replaced, or not transmitted to the server. A local controller at the client identifies and prevents private data from leaving the client device. Private items may include information in contact lists, locally present applications, database lists, such as music and video along with listing of data files (e.g. word processing documents etc.).

Figure 1:
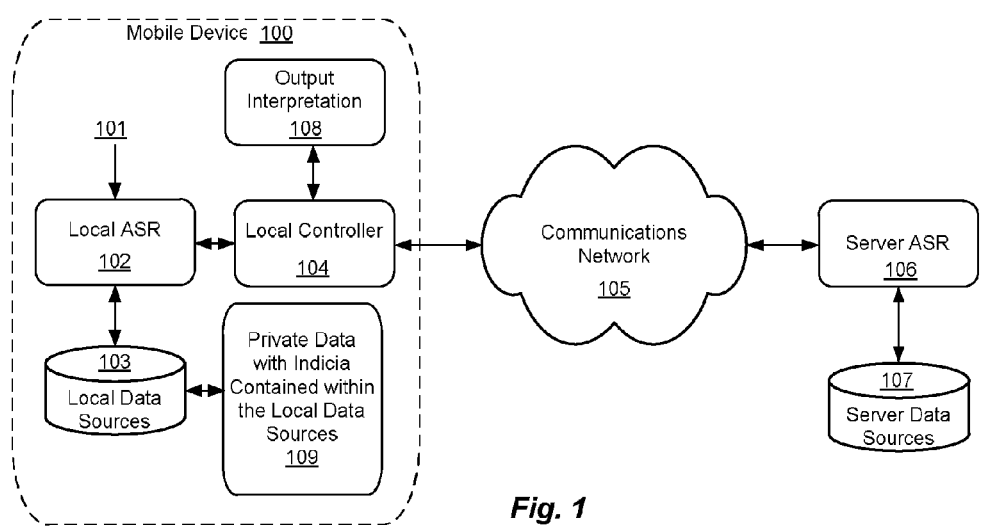
FIG. 1 shows an exemplary hybrid ASR arrangement according to an embodiment of the invention.

FIG. 1 shows an exemplary hybrid ASR arrangement according to an embodiment of the invention. A speech input 101 on mobile device 100 receives an unknown speech input signal from a user. A local ASR 102 receives in the speech input signal and produces a local speech recognition result. The local ASR uses local recognition data sources 103 to perform local ASR processing on the speech input signal to produce the local speech recognition result. The local speech recognition result may be unformatted recognition text, or derivatives of the result such as formatted recognition text or a semantic interpretation. In specific embodiments of the invention, a local controller 104 may determine if a remote ASR processing condition is met. If the remote ASR processing condition is met, the local controller determines based upon the local data sources 103 whether the speech recognition result includes private data 109. In other embodiments, the local controller does not determine if a remote ASR condition is met. In such an embodiment, the primary function of the local controller is to evaluate whether a local speech recognition result contains private data and prevent the distribution of portions of the speech signal containing private information from being distributed to remote ASR processors. Private data may be indicated by some form of indicia, such as a flag for a database field or a file that indicates field types within databases that are inherently private. Information may be globally indicated as private such as an entire personal address book or fields within an address book (e.g. telephone number) or information may be individually indicated as private such as the last name field for an addressee (e.g. Larry "Smith" (private)). Examples of local data sources include a user's browser history, the names of application on the local/client device, music lists including song titles and artists, and address books.

If information is identified within the speech input signal as being private information as indicated by some indicia within one of the local data sources, the local controller may take one of several actions to prevent the private data from being passed through the communication network 105 to the remote server 106. The local controller 104 may analyze the speech signal and identify the position or positions within the speech signal that contains private date. In typical ASR systems, the speech signal is sampled at a sampling rate. Each temporal sample has identifiable features of the speech signal and the sample is associated with a multi-dimensional feature vector. From the feature vectors, the ASR system can identify phonemes and subsequently words from a vocabulary source. Thus, there is a correspondence between one or more speech samples and recognized words within the vocabulary. The portion of the speech signal identified as containing private data may be removed or replaced with other data prior to the speech signal being sent to the remote server. In some embodiments of the invention if words are identified by the local ASR system with a probability of recognition above a certain threshold, these words, phrases, phonemes etc. will be identified as being private. For example, the local ASR system may be capable of producing a recognition result for the entire speech input signal without having all of the vocabulary words stored locally that are contained within the speech input. Thus, in order for the local controller to identify a word as being private, a certain confidence level should be met. In other embodiments, a one-way hashing function is employed. The local controller uses the hashing function to generated hashed data that replaces the portions of the speech signal that contain private information.

Additionally, the local controller may transform and reformat the speech input signal into a selected one a multiple different speech representation types. In one embodiment, the local controller creates a speech recognition log associated with the speech input signal. The log file may contain information about the speech input signal including when the signal was received and how the signal has been processed. The log may contain time information, the language model used for processing and acoustic event information. The log may even contain the local speech recognition result as determined by the local ASR. Prior to sending the transformed speech signal and log to the remote server 105, the local controller updates the log file to prevent any private data from being transferred from the mobile device. The local controller will look at each element within the log file to determine if the log information should be obscured (hashed, removed, replaced etc.) The local controller then sends the transformed speech signal and potentially the optional speech log over a communication network 105 to the remote server 106. The communication network may be a wired or wireless network.

In certain embodiments of the invention, when a hybrid ASR system is used, the local ASR and the remote ASR may be operated by different entities. In such a system, the remote ASR when accessed may query the local device for a download of all present data. For example, the remote ASR may query a cellular telephone (local device) for the complete address book of the local device. In such embodiments, the local device determines whether to grant the request of the remote ASR. The local device may determine that only private information from the address book presented within the speech signal will be transmitted to the remote ASR processing arrangement. The private information may be characterized as being declassified by the local device. For example, the local ASR may produce a local recognition result of "Meet Ted Evers at his home address of 32 Pine Road". In the local address book on the client device, the address for Ted Evers may have indicia that the information is private. However, the client device may declassify this information based on the fact that the information was presented within a speech signal and may transmit this information to the remote ASR server. Thus, some private information or some information from the address book is transmitted, however the entire contents of the address book are prevented from being transferred to the server. Embodiments of the invention may also prevent private information from being ported to local logs on a client device. The prevention of copying private information from a data store to a log prevents the later transmission of the log with private data. For example, a local log may be queried by a remote server for debugging purposes. By preventing the extraction of the private data from the local data stores, the private data is kept on the client/local device and is not transmitted in any form to an outside source.

The remote ASR processing arrangement 106, 107 performs speech recognition on the transformed speech input signal and may use the log information for generating a remote speech recognition result. The remote speech recognition result is then sent through the communications network back to the mobile device 100. The local controller accesses both the remote speech recognition result and the local speech recognition result and combines the results together to produce an output interpretation. The combination may be based on likelihood of one or more words being present within the original speech signal. For example, the local ASR system, because of the locally stored data stores is more likely to properly identify words, phrases, names and phonemes contained within the local data stores.

Thus, the local controller will use the portions of the local speech recognition result that have been identified within the speech signal with a high probability, which are likely found within the local data stores. In a similar fashion, all other words within the original speech signal will likely be recognized with a higher probability by the remote server ASR. The remote server ASR may be a distributed system and may also have a much larger vocabulary (e.g. databases, dictionaries) along with greater processing power and the capability to run more complicated speech recognition algorithms. Thus, the words not found within the local data stores will likely be recognized with a higher probability by the remote ASR system. The local controller can then combine the results together to produce the recognition result with the highest associated recognition probability. Additionally, the private words will be reinserted into the overall speech recognition result and the overall speech recognition result can be displayed on a the display device of the mobile device.

In one mode of operation, the mobile device may include a user input for accessing and updating data within the local data stores with some indicia for identifying that the information is private. FIG. 2 shows an exemplary screen display of a local data store. The data store represents an address book containing multiple entries. Each entry includes a plurality of fields. The fields include, last name, first name, address, city, state and zip code. Each element of an entry can be marked as private. Similarly, each field can also be marked as private. Thus, a user can mark any data as private, so that the mobile device will not transfer the portion of the speech signal containing the private data and the mobile device will prevent the portion of the local recognition result from being transferred off of the device. Therefore, the user has control whether data is identified as public or private and can change the setting.

Figure 3:
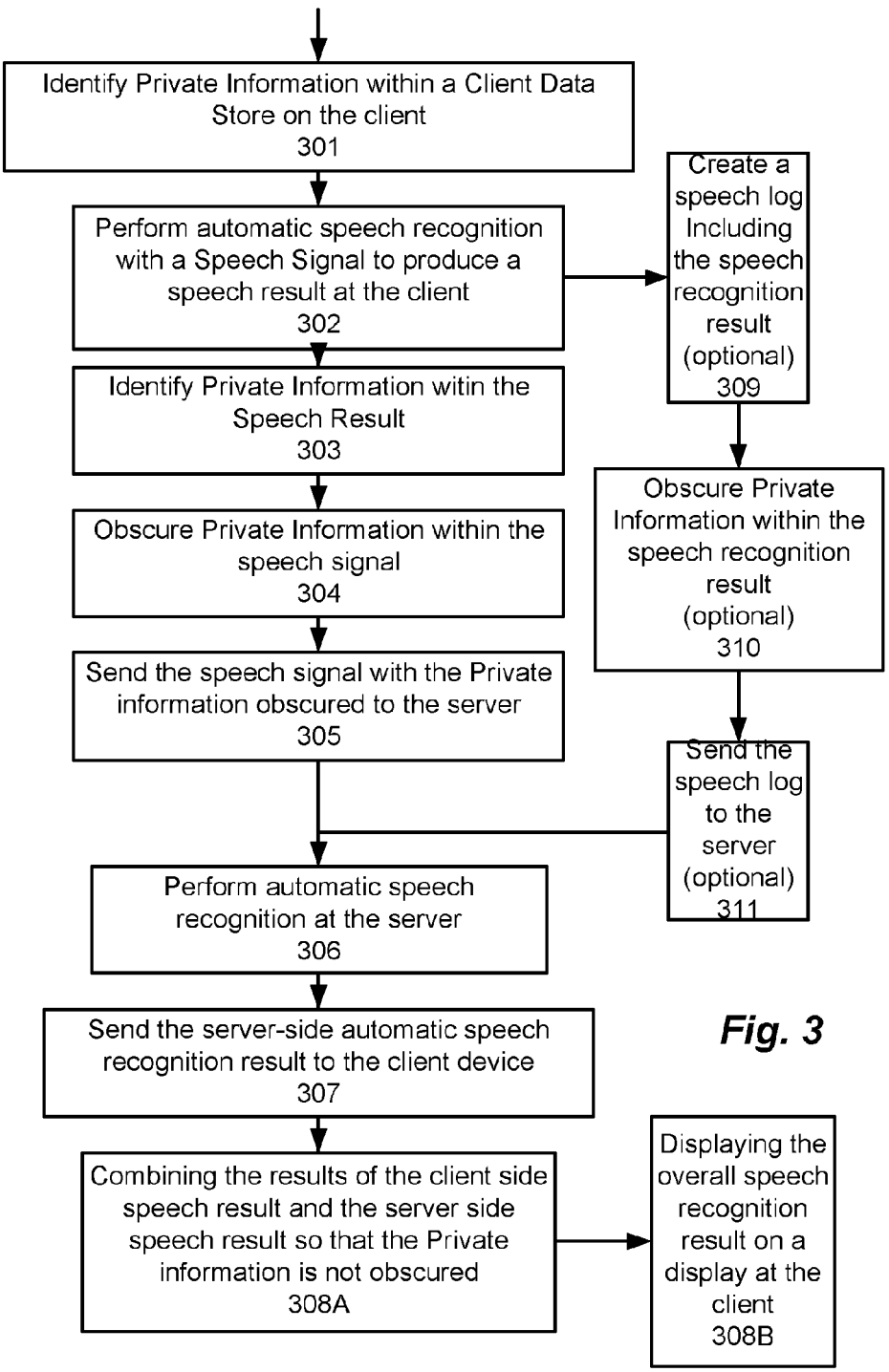
FIG. 3 is a flow chart showing a method for maintaining information as private within a hybrid ASR arrangement.

FIG. 3 is a flowchart establishing steps performed by both the local ASR system and the remote ASR system wherein private information is prevented from being distributed to a remote ASR server. A user or other party first establishes information within a client data store that will include an indicia indicating that the data is or is not private. This may be through an automated process, wherein all data found within a local data store is first designated as private or the data is designated as private based upon a characteristic or criteria set. In other embodiments, the designation of data as being private is achieved through an interactive process as the data is entered and edited by a user. 301

The mobile device performs automatic speech recognition on a speech signal from a user and produces a speech recognition result. 302 The speech recognition result is then used by a controller for identifying personal information within the speech recognition result. 303 The controller then obscures the personal information within the speech signal. The term obscure as used in this specification is meant to imply that the personal information within the speech signal is not capable of being decoded. Obscuring can be the result of removing, replacing or convolving/compressing/encrypting the portion of the speech signal associated with the private information. 304 In some embodiments of the invention, a speech log is created related to the speech signal. The speech log may contain, the speech recognition result, along with parameters about the speech signal. Parameters may include feature vectors, phoneme data, probability data along with identification information, such as an identifier for the device, an IP address or other identifiers. 309. The controller may obscure personal information contained within the speech recognition result that is stored within the speech log 310. Optionally, the speech log may be sent to the server 311.

The controller then sends the speech signal through a communication network to a server or distributed servers that include automatic speech recognizers. 305. Additionally, the controller may optionally send a speech log containing additional information about the speech signal to the server(s). The servers will then perform speech recognition on the received speech signal. The speech signal may or may not contain header information that indicates the locations within the speech signal where private information has been obscured (e.g. distorted, removed, replaced). 306 The automatic speech recognition process on the one or more distributed servers provide for more robust analytical power along with a greater vocabulary store for processing the speech signal. The speech recognition result from the server is then sent back to the client device. 307 The client device receives the remote speech recognition result and combines the result with the local speech recognition result where the private information part of the overall speech recognition result. 308A The overall speech recognition result is generated such that the words with the greatest confidence scores from the local speech recognition result and the remote recognition result are used. The overall speech recognition result will then be provided to the user on a display of the local device wherein the private information is not obscured on the client device 308B Embodiments of the invention may be implemented in whole or in part in any conventional computer programming language such as VHDL, SystemC, Verilog, ASM, etc. Alternative embodiments of the invention may be implemented as pre-programmed hardware elements, other related components, or as a combination of hardware and software components.

Embodiments can be implemented in whole or in part as a computer program product for use with a computer system.

Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A mobile device adapted for automatic speech recognition (ASR) for protecting private information on the mobile device comprising:
    a speech input component for receiving a speech input signal from a user;
    a local data store;
    a local ASR arrangement for performing local ASR processing of the speech input signal to produce a local speech recognition result and for determining if private information is included within the speech input signal by comparison of the local speech recognition result with data within the local data store; and
    a control unit for obscuring private information in the speech input signal if the local ASR arrangement identifies private information and for sending the speech input signal with the obscured private information to a remote server for ASR processing.

2. A mobile device according to claim 1, wherein the control unit creates a hash code of identified private information and inserts the hash code into the speech input signal prior to sending the speech input signal to the remote server.

3. A mobile device according to claim 1, further including:
    a user interface allowing a user to identify private information not to be transmitted to a remote server.

4. A mobile device according to claim 1, wherein the control unit obscures the private information by removing a portion of the speech input signal associated with the private information prior to transmitting the speech input signal to the remote server.

5. A mobile device according to claim 2, wherein the control unit receives a recognized version of the speech input including an indicia of the hash code and the control unit inserts the private information into the recognized version of the speech input at the indicia.

6. A mobile device according to claim 1, wherein the control unit obscures the private information by identifying the private information within the speech input signal and replacing the private information with a different signal.

7. A mobile device according to claim 1, wherein a log including speech processing events is sent to the remote server by the control unit.

8. A mobile device according to claim 7, wherein the log includes a text presentation of the speech input signal as recognized by the local ASR arrangement and any private information within the log is obscured with a hash code.

9. A mobile device according to claim 1, wherein, if the private information identified by the local ASR arrangement is contact information, the control unit accesses a contact list on the mobile device and transmits only a portion of the contact list to the server.

10. A mobile device according to claim 9, wherein the portion of the contact list includes last names without first names.

11. A mobile device adapted for automatic speech recognition (ASR) for protecting private information on the mobile device comprising:
    a speech input for receiving a speech input signal from a user;
    a local data store;
    a local ASR arrangement for performing local ASR processing of the speech input signal using identified private information sources within the local data store on the mobile device;
    wherein, if private information is identified in the result of the local ASR processing of the speech input signal, the control unit declassifies the private information; and
    a control unit for sending the speech input signal and declassified private information from the identified private information sources to a remote server for ASR processing.

12. A mobile device according to claim 11, wherein the identified private information sources include an address book.

13. A mobile device according to claim 11, wherein the result of the local ASR processing may include an N-best list and the declassified private information may include words or names in the N-best list and associated data.

14. A mobile device according to claim 11, wherein a subset of data from the private information sources is sent to the remote server for ASR processing.

15. A mobile device according to claim 14, wherein the subset of data may include a limited number of fields from a private information source database.

16. A method for protecting private information on a mobile device during automatic speech recognition, the method comprising:
    performing automatic speech recognition on an unknown speech signal on the mobile device producing a local speech recognition result;
    identifying private information within the local speech recognition result based on a comparison with data within a local data store on the mobile device;
    obscuring private information within the speech signal;
    transmitting the speech signal with the obscured private information to a server;

receiving a remote speech recognition result from the server; and outputting a combined speech recognition result based upon the local speech recognition result and the remote speech recognition result, wherein the private information is provided in the combined speech recognition result.

17. A method according to claim 16, further comprising: creating a speech log including a speech recognition result.

18. A method according to claim 17, further comprising: obscuring private information within the speech log prior to transmitting the speech log to the server.

19. A method according to claim 18, wherein the combined speech recognition result is output to a display device providing one or more possible speech recognition results based upon probability data from both the local speech recognition result and the remote speech recognition result.

20. A method for protecting private information on a mobile device during automatic speech recognition, the method comprising:

performing automatic speech recognition on an unknown speech signal on the mobile device producing a local speech recognition result;

identifying private contact information within the local speech recognition result based on a comparison with a contact list database within a local data store on the mobile device;

obscuring a first portion of the private contact information within the speech signal;

transmitting the speech signal with a second portion of the private contact information to a server, wherein the first portion of the private contact information is obscured;

receiving a remote speech recognition result from the server; and outputting a combined speech recognition result based upon the local speech recognition result and the remote speech recognition result, wherein the private contact information is provided in the combined speech recognition result.

21. A method according to claim 20, further comprising:

providing a user interface for selection of the second portion of the private contact information to transmit.

* * * * *